Oct. 7, 1958 E. C. CHEEVER 2,854,760
SEMI-AUTOMATIC GEAR TESTING MECHANISM
Filed March 18. 1955 4 Sheets-Sheet 1

INVENTOR.
ERNEST C. CHEEVER
BY
John Morton
HIS ATTORNEY

Oct. 7, 1958    E. C. CHEEVER    2,854,760
SEMI-AUTOMATIC GEAR TESTING MECHANISM
Filed March 18, 1955    4 Sheets-Sheet 2
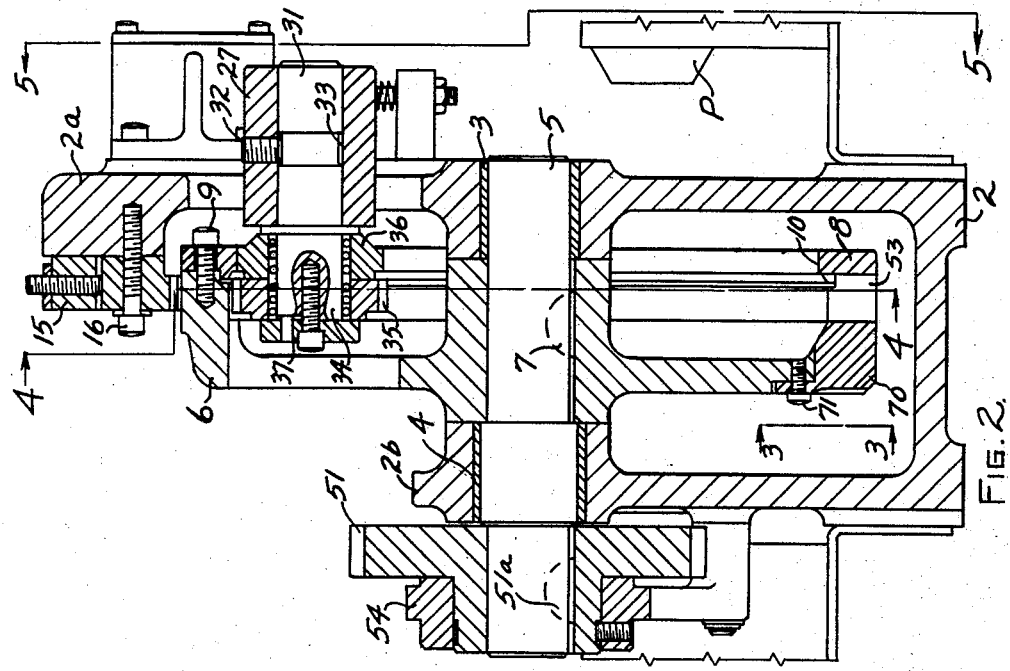
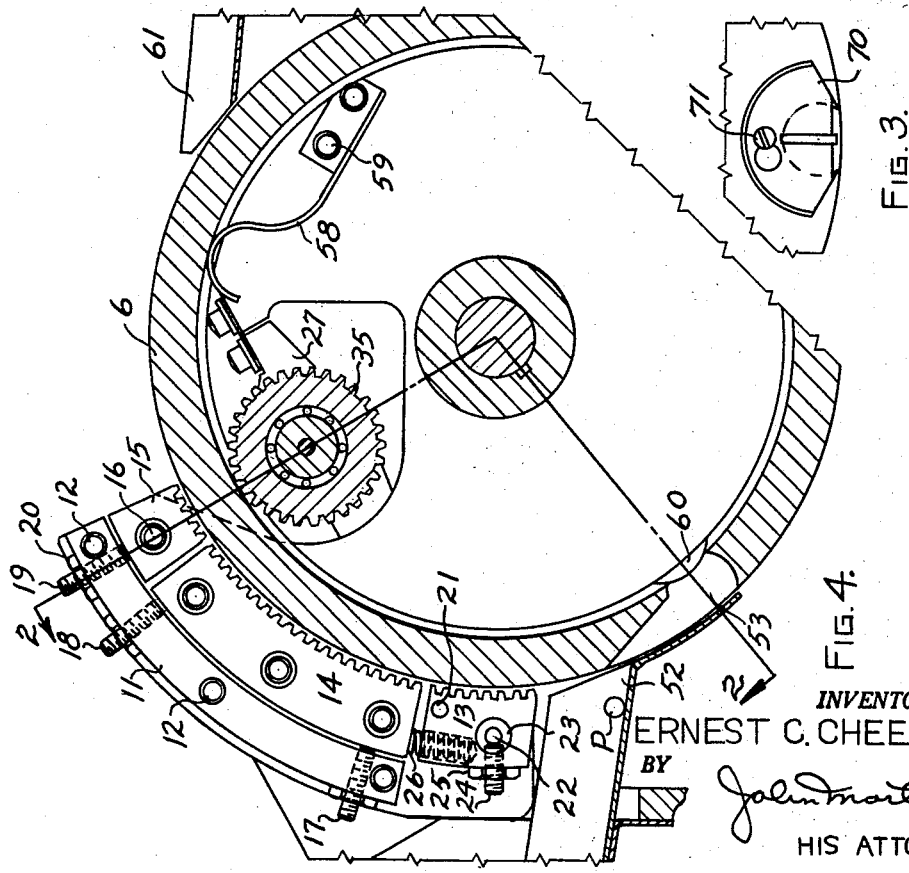
INVENTOR.
ERNEST C. CHEEVER
BY John Morton
HIS ATTORNEY.

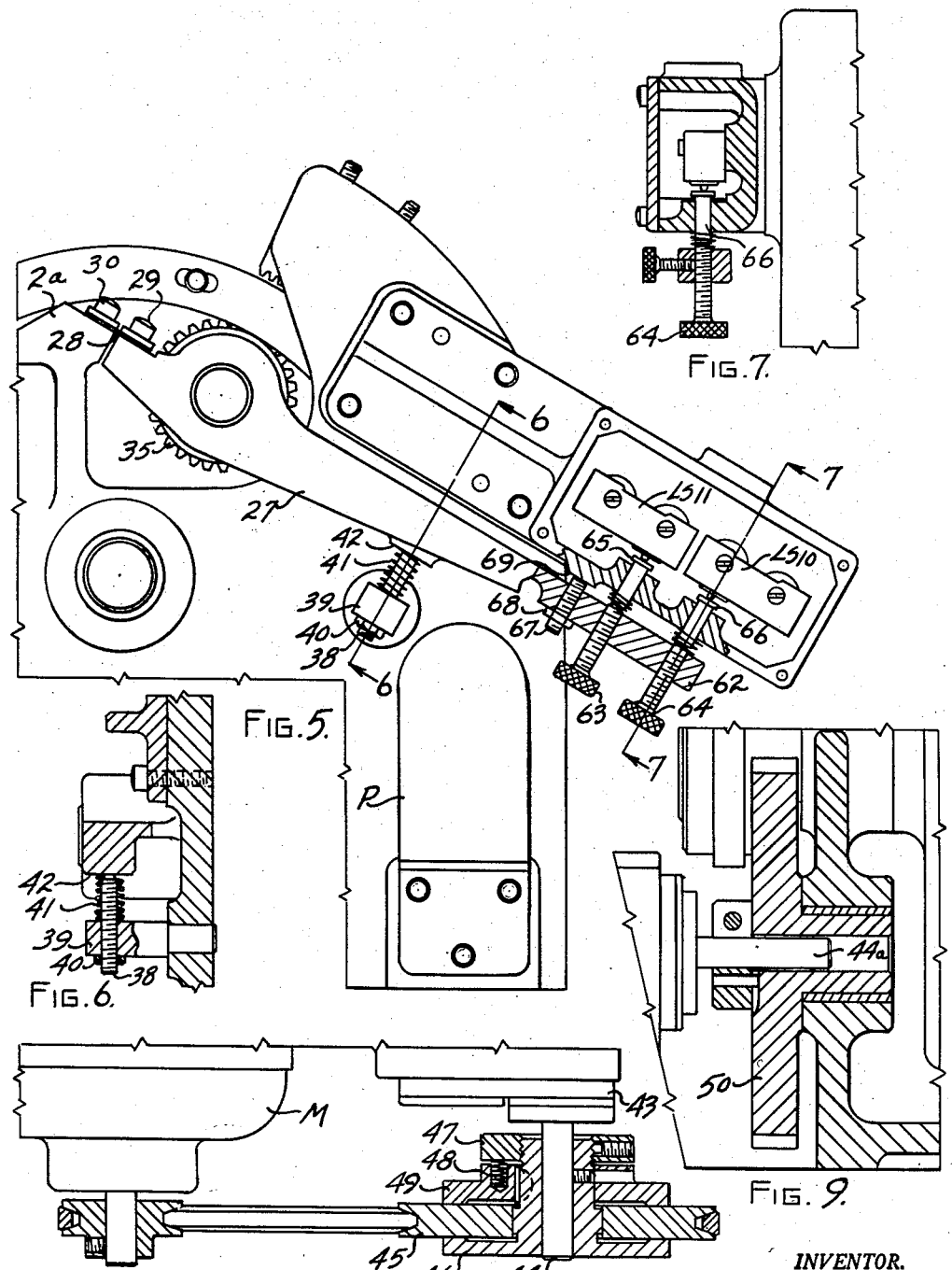

United States Patent Office 2,854,760
Patented Oct. 7, 1958

2,854,760

SEMI-AUTOMATIC GEAR TESTING MECHANISM

Ernest C. Cheever, Springfield, Vt., assignor to The Fellows Gear Shaper Company, Springfield, Vt., a corporation of Vermont Application March 18, 1955, Serial No. 495,208

13 Claims. (Cl. 33—179.5)

The present invention relates to the field of gear manufacture and is more particularly concerned with a device for testing and inspecting gears to see that these gears meet with prescribed standards. The device of the present invention is particularly adapted to be placed in a line of gear manufacturing equipment, for instance between the gear shaper in which the gears are cut from the rough and the gear shaving machine in which the gears are finished to their final desired form and shape. Even though the gear shaper normally produces accurate gears it sometimes happens that due to some mechanical malfunction such as a broken cutter tooth gears are obtained which are not within the accuracy desired. If such gears were to be passed on to the gear shaving machine, there is a possibility that the gear shaving tool would be damaged, causing a shutdown of the entire line.

Moreover, the device of the present invention may also be used as a last step in the manufacturing process to assure the obtaining of gears from the line which will meet the standards desired.

A primary object of the present invention is to provide a device of a semi-automatic type which will check the gears and prevent gears with tooth irregularities or form from passing to a succeeding manufacturing operation.

Another object of the invention is to eliminate the manual method of gear checking now commonly used, therefore reducing substantially the time required in the handling and the inspection of the gear teeth.

A further object of the present invention is to provide a device for checking gears which substantially speeds up production and accurately checks the gears in an efficient manner.

Other objects and features of the invention will be apparent as the description is taken in conjunction with the drawings.

In the drawings:

Figure 2 is a view taken on the line 2—2 of Figure 1 and Figure 4;

Figure 3 is a partial view taken on the line 3—3 of Figure 2;

Figure 4 is a sectional view taken on the line 4—4 of Figure 2;

Figure 5 is a partial elevation with some portions thereof in section and taken along the line 5—5 of Figure 2;

Figure 6 is a partial section taken on the line 6—6 of Figure 5;

Figure 7 is a partial section taken on the line 7—7 of Figure 5;

Figure 8 is a partial section taken on the line 8—8 of Figure 1;

Figure 9 is a partial section taken on the line 9—9 of Figure 1;

Like reference characters designate the same parts wherever they occur in all the figures.

Figure 1:
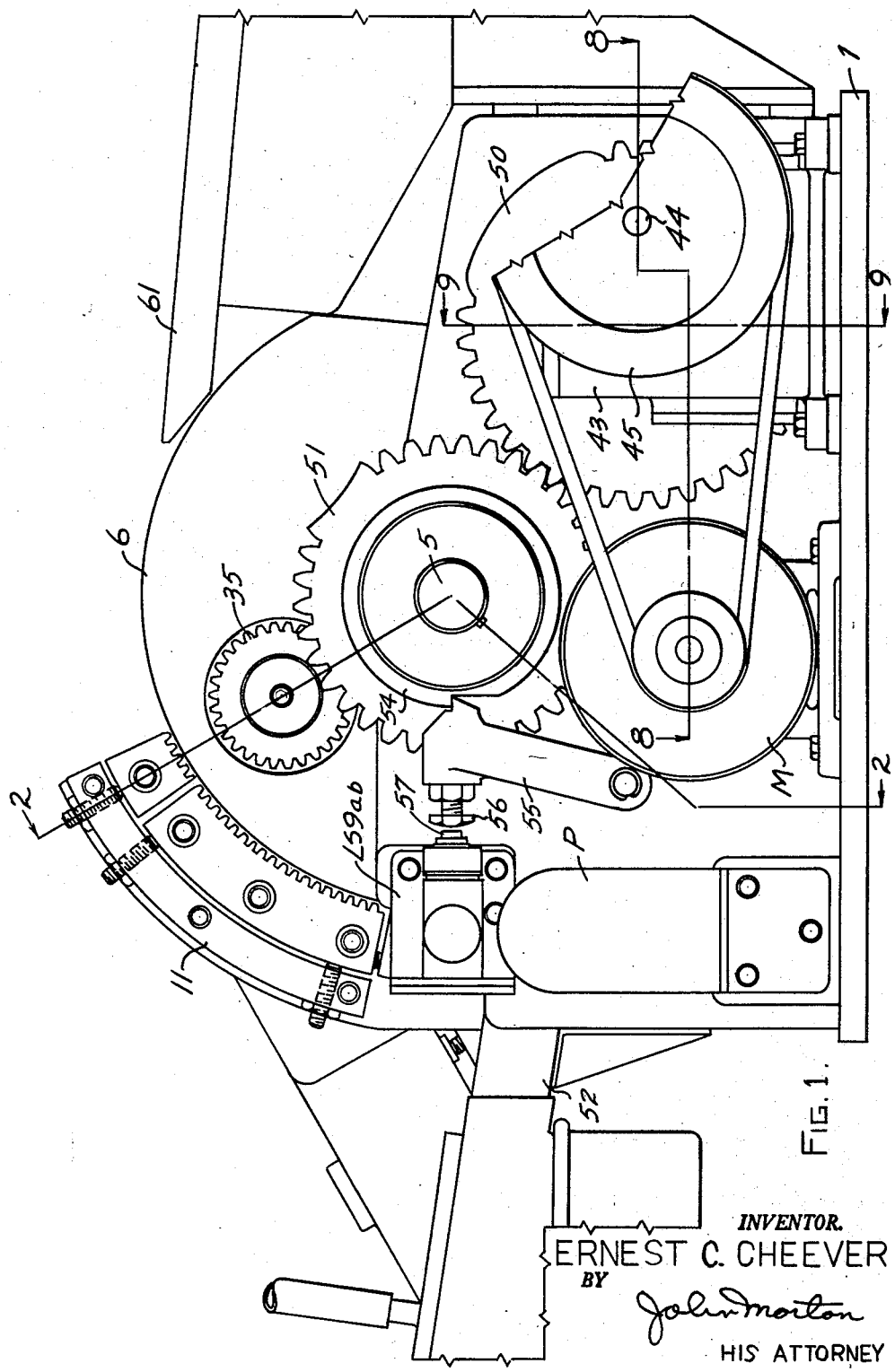
Figure 1 is a front elevation of the present invention with some parts being broken away to show elements located rearwardly of said broken-away parts.

The device of the present invention is mounted on a plate or table member 1. Fixed to this table member 1 is a supporting frame 2 as seen in Figure 2. This supporting frame 2 has upright portions 2a and 2b. Mounted in portion 2a is a bushing 3 and mounted in the portion 2b is a bushing 4. Rotatably mounted in bushings 3 and 4 is a spindle 5. An annular drum 6 is mounted on spindle 5 and keyed thereto as designated at 7 (Fig. 2). Fixed to the rear side of annular drum 6 is a carrier ring 8 which is bolted to drum 6 as shown at 9 (Fig. 2). The carrier ring 8 has an annular surface 10 which has a slight depression (not shown) in one portion thereof for a purpose to be later described.

An annular segment 11 is fixed to and held on upright portion 2a by means of bolts 12. Also mounted on the front face of upright portion 2a is a series of three gear segments 13, 14 and 15 as shown in Figure 4. These gear segments are held on the upright portion 2a by means of bolts 16 which pass through enlarged openings in the gear segments and are threaded into the portion 2a. The enlarged openings in the gear segments allow some adjustable movement of the gear segments on the portion 2a. In order to adjust the gear segments 14 and 15 bolts 17, 18 and 19 are threaded into the member 11 and abut the outer surfaces of the gear segments 14 and 15 as clearly shown in Figure 4.

As will be apparent when the bolts 17, 18 and 19 are rotated in a direction to move inwardly they will force the gear segments inwardly or if they are released to move outwardly the gear segments 14 and 15 will allow the gear segments to be moved in an outward direction and in either case upon reaching the desired adjusted position the gear segments 14 and 15 are locked securely in position by bolts such as 16. Lock nuts 20 are provided on the bolts 17, 18 and 19 to lock them in position when the desired amount of adjustment has been obtained.

The gear segment 13 is held in position on the portion 2a by means of a pivot pin 21 as seen in Figure 4. This pin 21 allows pivotal movement of the gear segment 13 about the pin 21 for a purpose to be later described. Also fixed in the portion 2a is a second pin 22. This pin 22 extends through an enlarged opening 23 in the gear segment 13. Threaded into the gear segment 13 is a bolt 24 which abuts the pin 22. The bolt 24 also has threaded thereon a lock nut 25. A spring member 26 is fitted in a pocket in the gear segment 13 and its outwardly extending portion abuts the gear segment 14. As viewed in Figure 4 it will be apparent that the spring member 26 tends to pivot the gear segment 13 in a counter-clockwise direction around the pin 22. Also as will be apparent the bolt 24 by means of its abutting relation with the pin 22 will limit the inward movement of the gear segment 13.

Fixed to the upright frame portion 2a is a swinging master arm 27. As seen in Figure 5 this master arm 27 is fixed to the portion 2a by the medium of a reed spring 28 which is bolted to the swinging master arm 27 as shown at 29 and bolted to the upright portion 2a by a bolt 30.

As shown in Figure 2 the master arm 27 has fixed therein a stub shaft 31. This stub shaft is held against longitudinal movement in the master arm 27 by means of a set screw 32 which is threaded into the master arm 27 and engages a grooved portion 33 in the stub shaft 31. On the outwardly extending portion 34 of the stub shaft 31 is rotatably mounted a master gear 35 and also a cam member 36. The master gear 35 and the cam member 36 are held in position on the stub shaft 31 by means of a collar and set screw arrangement designated generally at 37. It will be apparent as shown in Figure 2 that the cam member 36 engages the annular portion or surface 10 on the carrier ring 8. The engagement of the cam member 36 with the annular surface 10 serves to limit the outward movement of the swinging master arm 27 and will serve to hold the arm in a central position when the master gear is not actually measuring a work gear.

In order to urge the master arm 27 outwardly and so hold the cam member 36 in engagement with the annular surface 10 a bolt 38 is threaded into a nut 39 which is fixed to the upright portion 2a of the supporting frame 2. This bolt 38 is locked against movement by means of a lock nut 40 as viewed in Fig. 5 and Fig. 6. Encircling the bolt 38 is a spring member 41 which engages a boss 42 formed on the swinging arm 27.

Bolted to the plate member 1 is a drive motor M. Likewise bolted to the plate member 1 is a gear reduction unit 43. On the input shaft 44 of the gear reduction unit 43 is mounted a pulley 45.

As shown in Figure 8 pulley 45 is mounted on the shaft 44 through the medium of a collar 46. The collar 46 has threaded thereon a ring member 47 which through the medium of a spring 48 forces a second ring member 49 into engagement with the pulley 45. The pulley 45 is made with a friction fit with respect to the collar 46. Also the ring member 49 being forced into engagement with the pulley 45 by means of springs such as 48 will tend to frictionally hold the pulley 45 against rotation with respect to the collar 46 and correspondingly the shaft 44. However, when a load of sufficient force is applied to the shaft 44 the pulley 45 will rotate with respect to said shaft and the motor M will not serve to rotate the shaft 44.

On the output shaft 44a (see Fig. 9) of the gear reduction unit 43 is mounted an interrupted gear 50. This interrupted gear 50 is in intermeshing engagement with a second interrupted gear 51. This gear 51 is keyed to the spindle 5 at 51a as clearly seen in Figure 2. It will readily be apparent that when the motor M is rotated therefore that the annular drum 6 will be correspondingly rotated through the belt and pulley arrangement described above and the gearing 50, 51.

The table member 1 on which the device of the present invention is mounted is located adjacent to a gear cutting machine of any desired character. Leading from the gear cutting machine is a chute 52. This chute 52 is adapted to receive a cut gear when it is ejected or removed from the gear cutting machine. Located in the end of the chute 52 is a photo-electric cell designated generally as P.

Formed in the annular drum 6 is an opening 53. This opening 53 is of such a character as to accommodate a gear of the type being cut and as the gear after being cut rolls down the chute 52 it will drop into the opening 53 provided that the annular drum 6 has been rotated to the proper position to receive the gear as it drops off the chute 52 at its exit end.

On the gear 51 and fixed to rotate therewith is a cam member 54. This cam member 54 may be held against rotation with respect to the gear 51 by means of a set screw or other suitable mechanism. As seen in Figure 1 the cam 54 and the gear 51 are arranged so as to rotate in a clockwise direction. Fixed to and arranged for pivotal movement on the frame member 2 is a cam lever 55. Cam lever 55 is arranged to ride on the outer surface of the cam 54 for a purpose to be later described. Mounted in the cam lever 55 is a timing screw 56 which screw upon movement of the cam lever 55 in a counterclockwise direction will make contact with plunger 57 of a holding switch designated LS9–ab.

Fixed to the frame member 2 is a spring member 58 by means of bolts 59. This spring member 58 is adapted to enter the opening 60 which is an extension of the opening 53 formed in the annular drum 6. This opening 60 is adjacent to the depression in surface 10 previously mentioned. When the annular drum 6 has been rotated to a position so that the spring 58 can enter the opening 60 any gear which is placed in the opening 53 will be forced outwardly from the annular drum 6 and into a second chute 61. From this second chute 61 the gear may be either fed to another finishing operation or stored for stock.

In operation, as a gear rolls down the chute 52 the motor M is actuated by any suitable electrical system such as is described below and the drum 6 will be rotated in a clockwise direction. A gear placed in the opening 53 will first engage the gear segment 13. This gear segment 13 serves as an aligning segment so that the teeth on the work gear will be in position to engage properly the teeth in gear segments 14 and 15. The teeth of segments 13, 14, and 15 constitute a series to form a part of a single system cooperating to orient and measure a work gear. Due to the movement allowed to the gear segment 13 about the pivot pin 22 through the cooperation of spring 26 and bolt 24 the teeth on the work gear will be rotated a sufficient amount to properly align them for the inspection or testing operation.

The teeth in the gear segment 14 are made with teeth which are thinner than normal but have a longer addendum than normal so as to properly check the root diameter of the work gear. Moreover, there are sufficient teeth in the sector 14 so that the sector is longer than one circumference of the work gear being tested. When the work gear is rotated in mesh with the gear segment 14 this sector will tell if a tooth in the cutter of the gear cutting machine is broken or is not cutting deep enough to allow a sufficient amount of clearance so that a finishing operation can be carried out on the work gear.

If the gear goes through its intermeshing relationship with the gear segment 14 properly it then meshes with the teeth on the gear sector 15. This gear sector 15 has teeth which have the desired correct tooth thickness necessary to be formed during the cutting operation on the work gear. When the work gear is in intermeshing relationship with the gear sector 15 it is also intermeshing with the master gear 35 which is mounted on the stub shaft 31.

As seen in Figure 5 at the outer end 62 of the swinging master arm 27 are threaded two adjustable screws 63 and 64. These adjustable screws 63 and 64 are arranged to engage contacts 65 and 66 of limit switches LS11 and LS10. Likewise threaded into the outer end 62 of arm 27 is set screw 67 which may be locked against movement by a lock nut 68. This set screw 67 abuts a surface 69 mounted on the upstanding portion 2a of frame 2 and as will be at once apparent this set screw 67 will serve to limit the movement of the swinging arm 27.

From the above it will be seen that if, for example, there is a broken tooth in the cutter forming the work gear or if for any other reason the teeth are not properly formed on the work gear that when the work gear is forced into engagement with the teeth on the sector 14 there will be a tendency for the testing device and for the rotation of the annular drum 6 to jam and the drive from the motor M to the gear reduction unit will slip due to the friction arrangement and construction of the pulley 45 with respect to the shaft 44 as described above. If the testing device slips for a sufficiently long period of time electrical arrangements can be made so that after the lapse of a predetermined time the current to the motor M will be shut off. The interrupted gears 50 and 51 are used so that as the gear being measured is brought into testing position, the drive to the drum 6 will stop for a sufficiently small period of time so as to allow the electrical connections to operate through the necessary relays to be employed.

If the gear being inspected or tested is oversize when it reaches engagement with the gear segment 15 and the master gear 35 the arm 27 will tend to be rotated in a clockwise direction about its pivotal mounting provided by spring 28. The depression in surface 10 previously described allows this movement to occur. Similarly if the gear being measured or tested is under size the arm 27 will tend to be rotated in a counterclockwise direction.

Limit switch LS11 will be actuated upon movement of the arm 27 about its pivot in a counter-clockwise direction. This will occur when an undersized gear is rotated in mesh with the gear segment 15 and the master gear 35. Spring 41 will tend to urge master arm 27 in an upwardly direction as viewed in Figure 5.

The limit switch LS10 will be actuated upon movement of the arm about its pivotal mounting in a clockwise direction. This occurs when a gear having teeth too wide passes through the present device thus having a tendency to rotate master arm 27 in a clockwise direction. Actuation of limit switch LS10 or LS11 will shut off the motor M through the electrical connections set forth below and stop the rotation of the drum 6 carrying with it the work gear. However, if the gear is of the proper size the annular drum 6 will continue to rotate carrying with it the work gear and it will be forced then by the spring 58 out of its position in the opening 53 into the chute 61.

A cover plate 70 may be attached to the annular drum 6 by means of a set screw 71 or the like and this cover plate 70 is arranged axially of the drum 6 and serves to cover the opening 53. If the testing device is stopped by reason of the fact that there is an improperly sized gear rotating in mesh with the gear segments 14 and 15 then the operator will remove the cover plate 70 manually and remove the improperly sized gear from the testing device.

Figure 10:
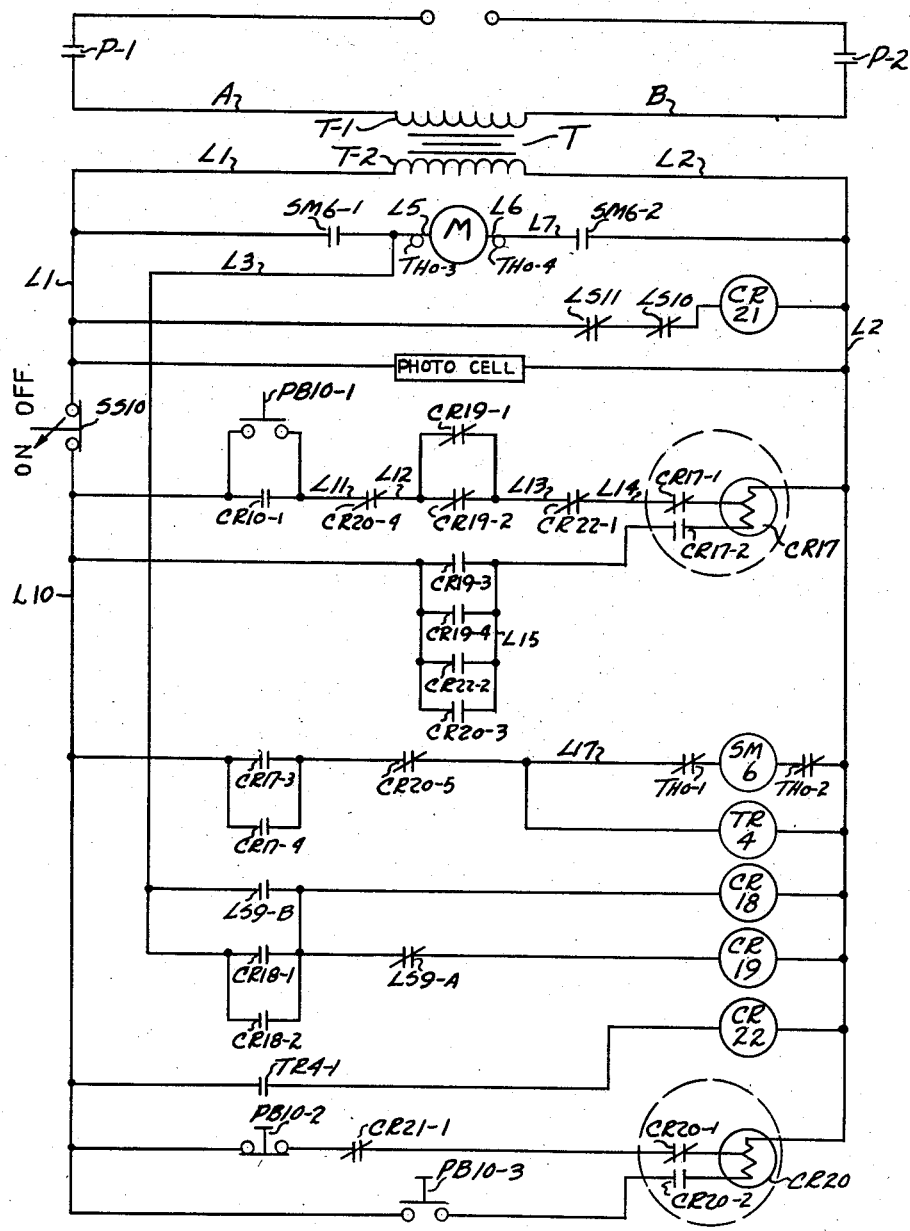
Figure 10 is a typical schematic electrical diagram which can be employed if desired to actuate the mechanical elements of the device of the present invention in the proper desired timed relationship.

Electrical controls may be employed to time the various motions of the present invention and they may be of the type shown schematically in Figure 10.

When the main power switch (not shown) is closed contacts P–1 and P–2 close thus energizing the primary T–1 of transformer T through lines A and B. The secondary T–2 of transformer T is energized and allows the main lines L1 and L2 to become energized. The photo cell control is energized and a light beam is lighted which shines across the path of conveyor chute 52. Limit switches LS11 and LS10 are closed and control relay CR21 is energized. Switches LS11 and LS10 are normally closed but may be broken for a purpose to be described later.

When the power selector switch SS10 is turned "On" line L10 becomes energized. As the gear to be checked rolls down chute 52 it interrupts the light beam and a control relay which is in the photo cell causes its contact CR10–1 to close. With the closing of CR10–1 the circuit is complete between L10 and L14. Contacts CR20–4, CR19–2, CR22–1 and CR17–1 are all closed so control relay CR17 is energized and caused to latch up. When control relay CR17 latches up its contacts CR17–1 opens, then CR17–2 closes. Control relay CR17 remains magnetically latched up (it is a holding circuit relay) until L15 is energized at a later time.

Contacts CR17–3 and CR17–4 close to complete the circuit to L17 and thus energize the overall timer TR4 and through the thermo safety elements THO–1 and THO–2 the motor starter SM6 is energized.

Contacts SM6–1 and SM6–2 of motor starter SM6 close and the circuit is complete to motor M. Motor M starts. THO–3 between lines L3 and L5 and THO–4 between lines L6 and L7 are thermo heater safety elements which when overheated melt thus breaking the circuit and preventing the motor M from burning.

Carrier ring 8 and annular drum 6 start rotating. The gear to be inspected drops into opening 53 of annular drum 6 and is then rotated in mesh with first the aligning segment 13, then the two other segments 14 and 15.

The motor M continues to operate and the carrier ring 8 and annular drum 6 continue to rotate. Providing the gear being checked is of prescribed conformity the drum 6 will continue to rotate and then the spring 58 ousts the gear from the device and onto the chute 61.

Cam 54 rotates with annular drum 6. When cam 54 starts rotating lever 55 is moved out of the cam recession and the timing screw 56 of lever 55 actuates plunger 57 of holding limit switch LS9A–B. LS9–A opens and LS9–B closes. Coil CR18 energizes. Contacts CR18–1 and CR18–2 close to form a holding circuit for CR18. At the end of one revolution of rotation of annular drum 6 cam lever 55 drops into the recession provided on cam 54 at which time LS9–B opens and LS9–A closes to energize control relay CR19.

When control relay CR19 energizes contacts CR19–1 and CR19–2 open and CR19–3 and CR19–4 close to reset control relay CR17. Contacts CR19–3 and CR19–4 are located between lines L10 and L15. When closed they allow a current to be fed to the second half of control relay CR17 which is necessary to reset by opening CR17. Likewise, CR19–1 and CR19–2 located between lines L2 and L13 are necessary to close CR17 and when they are closed they make the necessary contact through line L14 to reset by closing control relay CR17.

Control relay CR17 is a magnetically operated latching relay. When energized from line L14, CR17–1 opens and CR17–2 closes just at a point when the magnetism in the core is at a maximum. Therefore, it latches magnetically.

When control relay CR17 is energized from line L15, line L15 allows enough current to be fed to control relay CR17 to decay the magnetism and the plunger (not shown) falls and CR17–2 opens and CR17–1 closes. At this time CR17–3 and CR17–4 open and through line L17 de-energize motor starter SM6 and timer TR4. The contacts of motor starter SM6, SM6–1 and SM6–2 open to stop motor M. When contacts SM6–1 and SM6–2 open coil CR19 is de-energized.

Now assuming that a gear with a broken tooth or one with a missing tooth or one that does not have its teeth formed to a sufficient depth passes through the device of the present invention it is likely that the gear of such a nature will jam in one of the segments and therefore stall the rotation of annular drum 6 and carrier ring 8. At this point the motor continues running through the medium of the friction drive mechanism which includes pulley 45 and which has been previously described. Overall timer TR4 runs out its cycle and times out. TR4 de-energizes and TR4–1 closes to energize CR22. When CR22 energizes its contactors CR22–1 opens and CR22–2 closes to de-energize CR17 thus allowing the plunger (not shown) of CR17 to fall. When CR17 is de-energized its contacts CR17–3 and CR17–4 open to de-energize motor starter SM6 and its contacts SM6–1 and SM6–2 open to stop motor M. The bad gear may be extracted from the sizer by hand, but first it is advisable to turn selector switch SS10 to "Off."

Assume that a gear is over or undersize and it passes through the device. Such a gear may easily pass by the first two segments. When it comes to mesh with the master gear 35 and the segment 15 opposite the master gear it will cause the master gear 35 to be moved in either an upward or downward direction. Keeping in mind that the master gear 35 is rotatably mounted to master arm 27 which is movable and if the gear being checked has teeth too wide then it will have a tendency to move master gear 35 and master arm 27 in a downward or clockwise direction thus moving adjustment screw 64 of outer end 62 of arm 27 away from the plunger 66 of limit switch LS10 to actuate LS10 by breaking the contact and de-energizing CR21.

When CR21 de-energizes its contact CR21–1 closes to cause control relay CR20 to latch up. When CR20 latches its contact CR20–4 opens and CR20–3 closes causing CR17 to reset. When CR17 resets CR17–2 closes. Contact CR20–4 remains open to prevent CR17 from relatching, and contact CR20–5 opens to de-energize motor starter SM6 and timer TR4. The contacts of motor starter SM6, SM6–1 and SM6–2, open to stop motor M.

If a gear having narrow teeth passes through the device the same above procedure of de-energization functions with the exception that master gear 35 and master arm 27 will move in an upward or counter-clockwise direction and adjustment screw 63 of outer end 62 of arm 27 will actuate the plunger 65 of limit switch LS11 to start the sequence. When PB10–1 is pressed it closes and PB10–2 opens and PB10–3 closes to knock down or reset control relays CR20 and CR17.

PB10 is used when it is desired to start the device in operation if it jams or if there is no interruption of the beam from photo-electric cell P to close CR10–1. PB10–1 closes to energize line L11 when CR20–4 closes due to CR20 being reset. PB10 must be held in until limit switches LS10 or LS11 are released. This is usually done by the operator.

In restarting the machine by pressing PB10, PB10–2 causes CR20 to energize which closes CR20–5 to energize starter motor SM6 because at the same time CR17 causes its contacts CR17–3 and CR17–4 to close thus completing the circuit to motor starter SM6 which causes its contacts SM6–1 and SM6–2 to close and motor M to start. But first either limit switch LS10 or LS11, whichever one caused the stop, must be released in order to energize coil CR21 so that its contact CR21–1 will close to complete the circuit to CR20 so that it can be energized.

What I claim and desire to secure by Letters Patent is:

1. In a gear testing device of the class described, a supporting frame, an annular drum rotatably mounted thereon, said drum having a recession in its periphery for carrying a gear to be inspected during rotation of said annular drum, means for rotating said drum, a plurality of internal concave gear segments mounted on said supporting frame having their concave sides adjacent to the periphery of said drum, one of said gear segments having teeth of larger addendum than normal, and said means for rotating said drum including mechanism to interrupt the rotation of said drum when a gear of enlarged root diameter meshes with said last mentioned segment.

2. In a gear testing device of the class described, a supporting frame, an annular drum rotatably mounted thereon, said drum having a recession in its periphery for carrying a gear to be inspected during rotation of said annular drum, a plurality of internal concave gear segments mounted on said supporting frame having their concave sides adjacent to the periphery of said drum, one of said gear segments having teeth of larger addendum than normal, means for rotating said drum so that a work gear mounted in said recession has its teeth in position to mesh with the teeth on said gear segments, and said means for rotating said drum including mechanism to interrupt the rotation of said drum when a gear of improper root diameter meshes with said last mentioned segment.

3. In a gear testing device of the character described, a supporting frame, a work gear carrier movably mounted thereon, a work supporting means on said carrier, a gear segment mounted on said supporting frame adjacent to said carrier, a pivotal mounting for said gear segment whereby said gear segment may pivot towards and away from said carrier to allow the teeth on a work gear to mesh with the teeth on said segment, a plurality of gear segments mounted on said supporting frame in series with said first gear segment, gear teeth on said plurality of gear segments having different tooth characteristics so that a work gear held on said work supporting means will have different elements thereof inspected, and means to move said carrier relative to said gear segments so as to roll said work gear in mesh with said segments.

4. In a gear testing device of the class described, a supporting frame, an annular drum rotatably mounted thereon, said drum having a recession in its periphery for carrying a gear to be inspected during rotation of said annular drum, means for rotating said drum, a plurality of internal concave gear segments mounted on said supporting frame having their concave sides aligned with the periphery of said drum, a master gear arm pivotally attached to said supporting frame, a master gear rotatably mounted on the said master gear arm with the periphery of said master gear being adjacent one of said gear segments and a friction drive included in said means for rotating said drum whereby the rotation of said drum will be arrested when a gear having non-prescribed irregularities is rotated in mesh with said segments and master gear.

5. In a gear testing device of the character described, a supporting frame, a work gear carrier movably mounted thereon, a work supporting means on said carrier, a gear segment mounted on said supporting frame adjacent to said carrier, a pivotal mounting for said gear segment whereby said gear segment may pivot towards and away from said carrier to allow the teeth on a work gear to mesh with the teeth on said segment, resilient means urging said gear segment in the direction of said carrier, means to limit the movement of said gear segment toward said carrier, a plurality of gear segments mounted on said supporting frame in series with said first gear segment, gear teeth on said plurality of gear segments having different tooth characteristics so that a work gear held on said work supporting means will have different elements thereof inspected, and means to move said carrier relative to said gear segments so as to roll said work gear in mesh with said segments.

6. In a gear testing device of the character described, a supporting frame, a work gear carrier movably mounted thereon, a work supporting means on said carrier, a gear segment mounted on said supporting frame adjacent to said carrier, a pivotal mounting for said gear segment whereby said gear segment may pivot towards and away from said carrier to allow the teeth on the work gear to mesh with the teeth on said segment, a second gear segment mounted on said frame in series with said first mentioned gear segment, said second gear segment having teeth with longer than normal addendum, means to move said carrier relative to said gear segments so as to roll said work gear in mesh with said segments, and means to interrupt the movement of said carrier should a work gear with an enlarged root diameter be mounted on said work supporting means.

7. In a gear testing device of the character described, a supporting frame, a work gear carrier movably mounted thereon, a work supporting means on said carrier, a gear segment mounted on said supporting frame adjacent to said carrier, a pivotal mounting for said gear segment whereby said gear segment may pivot towards and away from said carrier to allow the teeth on a work gear to mesh with the teeth on said segment, resilient means urging said gear segment in the direction of said carrier, means to limit the movement of said gear segment toward said carrier, a second gear segment mounted on said frame in series with said first mentioned gear segment, said second gear segment having teeth with longer than normal addendum, means to move said carrier relative to said gear segments so as to roll said work gear in mesh with said segments, and means to enable interruption of the movement of said carrier should a work gear with an enlarged root diameter be mounted on said work supporting means.

8. In a gear testing device of the character described, a supporting frame, an annular drum rotatably mounted thereon, a work gear holding means on said drum, a series of internal gear elements mounted on said frame adjacent to said drum in position so that a work gear held in said holding means will rotate in mesh with said elements, a pivotal mounting for the first of said gear elements in said series, resilient means urging said first gear element toward said drum, a second of said gear elements having teeth with a longer than normal addendum, means to rotate said drum whereby a work gear held on said drum will roll in mesh with said internal gear elements and friction drive means included in said rotating means so that when a work gear of enlarged root diameter meshes with said second gear element the rotation of said drum will be interrupted.

9. A device according to claim 8 in which a third internal gear element is provided said third gear element having teeth thereon of a prescribed conformation and means to stop rotation of said annular drum should a work gear not conform to said prescribed conformation.

10. A device according to claim 9 in which the means for stopping rotation of said annular drum includes a pivotally mounted master gear arm, a master gear on said arm adapted to mesh with said work gear, and means on said master gear arm adapted to actuate said rotation stopping means in accordance with the departure from normal of the tooth shape of said work gear.

11. A device as set forth in claim 10 in which a cam member is mounted on said master gear arm, and a means is fixed to said annular drum to coact with said cam member to maintain said master gear in a centrally disposed position.

12. A device as set forth in claim 10 in which means is provided to stop rotation of said annular drum after substantially one complete rotation of said drum.

13. A device as set forth in claim 12 in which said means to stop rotation of said annular drum includes a cam member mounted coaxially with said drum and a pivotally mounted follower mounted on said supporting frame to initiate actuation of said rotation stopping means.

References Cited in the file of this patent

UNITED STATES PATENTS

| | | |
|---|---|---|
| 1,586,155 | Keller | May 25, 1926 |
| 2,319,833 | Troy | May 25, 1943 |
| 2,436,528 | Polk | Feb. 24, 1948 |
| 2,531,317 | Baney | Nov. 21, 1950 |
| 2,661,542 | Bean | Dec. 8, 1953 |
| 2,726,456 | Pergande | Dec. 13, 1955 |
| 2,761,560 | Pomernacki | Sept. 4, 1956 |

FOREIGN PATENTS

| | | |
|---|---|---|
| 382,495 | Great Britain | Oct. 27, 1932 |